(12) United States Patent
Jacobson et al.

(10) Patent No.: US 7,167,970 B2
(45) Date of Patent: Jan. 23, 2007

(54) TRANSLATING LOADS FOR ACCELERATING VIRTUALIZED PARTITION

(75) Inventors: Quinn A. Jacobson, Sunnyvale, CA (US); Shailender Chaudhry, San Francisco, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 11/135,838

(22) Filed: May 23, 2005
(Under 37 CFR 1.47)

(65) Prior Publication Data

US 2006/0064567 A1     Mar. 23, 2006

Related U.S. Application Data

(60) Provisional application No. 60/574,040, filed on May 24, 2004.

(51) Int. Cl.
*G06F 12/08*     (2006.01)
(52) U.S. Cl. ....................................... 711/207
(58) Field of Classification Search ..................... None
See application file for complete search history.

(56) References Cited

U.S. PATENT DOCUMENTS

| 6,742,103 B2 * | 5/2004 | Chauvel et al. ............. 711/207 |
| 6,742,104 B2 * | 5/2004 | Chauvel et al. ............. 711/207 |
| 2002/0062434 A1 * | 5/2002 | Chauvel et al. ............. 711/207 |
| 2002/0065989 A1 * | 5/2002 | Chauvel et al. ............. 711/130 |
| 2005/0188175 A1 * | 8/2005 | Chiang et al. ............. 711/206 |
| 2005/0188176 A1 * | 8/2005 | Chiang et al. ............. 711/206 |

* cited by examiner

*Primary Examiner*—Kevin Verbrugge
(74) *Attorney, Agent, or Firm*—Gunnison, McKay & Hodgson, L.L.P.; Forrest Gunnison

(57) ABSTRACT

A system, which includes a processor that includes a plurality of cores, generates an address translation when there is a miss in a translation lookaside buffer (TLB). A hypervisor utilizes a translating load instruction that upon execution on the processor generates a data portion of a TLB entry. Execution of the translating load instruction utilizes information from a real-to-physical address translation table entry and information provided in the call to the translating load instruction to synthesize the data portion of a new virtual-to-physical translation table entry.

30 Claims, 13 Drawing Sheets

TRANSLATING LOADS FOR ACCELERATING VIRTUALIZED PARTITION

RELATED APPLICATION

This application claims the benefit of U.S. Provisional Application No. 60/574,040 filed May 24, 2004 entitled "Translating Loads for Accelerating Virtualized Partition" and naming Quinn A. Jacobson and Shailender Chaudhry as inventors, which is incorporated herein by reference in its entirety.

BACKGROUND OF THE INVENTION

1. Field of the Invention

The present invention relates generally to memory management in computer systems, and more particularly to accelerating address translations following a translation lookaside buffer miss.

2. Description of Related Art

Virtual memory and the addresses used to locate information in the virtual memory is an old concept. Historically, virtual addresses were used to provide a large memory space to applications by a processor. The processor converted the virtual addresses to a physical address. To reduce the overhead in mapping a virtual address to a physical address, a translation lookaside buffer 100 (FIG. 1) was used.

Translation lookaside buffer 100 was a cache for holding recently used mappings from virtual addresses to physical addresses. Typically, a virtual address had two parts an offset and a virtual page identifier. The offset was the same for both the virtual address and the physical address.

Thus, the virtual address in FIG. 1 that was presented to translation lookaside buffer (TLB) 100 was the virtual page identifier. Translation lookaside buffer 100 checked to see if the virtual page identifier was stored in the cache and if it was, TLB 100 returned the physical address, which was the base address of the page in physical memory. However, if TLB 100 did not contain the virtual page identifier, a more detailed mapping was required using stored memory mapping tables and the TLB was updated as appropriate.

This approach was sufficient for a single operating system handling multiple applications, e.g., contexts. However, in main frames a further abstraction was introduced, e.g., virtual hardware.

As illustrated in FIG. 2, a plurality of operating systems 210_1, 210_2, e.g., different instances of the same operating system, or alternatively different operations systems, used a hardware processor 250. Each operating system supported a plurality of applications, e.g., operating system 210_1 supported applications 201_1, 201_2 and operating system 210_2 supported applications 202_1, 202_2.

In system 200, the hardware is logically partitioned. Logical partitioning allows multiple copies of a single operating system (OS) or multiple heterogeneous operating systems to simultaneously run on a single data processing system platform. A logical partition, within which an operating system image runs, is assigned a non-overlapping sub-set of the platform's resources. These platform allocable resources include one or more architecturally distinct processors with their interrupt management area, regions of system memory, and I/O adapter bus slots.

Hypervisor 210, typically implemented as firmware, performed a number of functions and services for operating systems 210_1, 210_2 to create and enforce the logical partitions. Hypervisor 210 owned all system resources and provided an abstraction layer through which device access and control was arbitrated.

Hypervisor 210 and firmware handled the mapping of memory, CPUs and adapters for each logical partition. Applications were generally unaware of where the partition's memory was located, which CPUs had been assigned, or which adapters were in use.

Each application had it owns virtual address space. The operating system associated with a particular application converted a virtual address to a real address. As far as the operating system was concerned the real address started at zero and went to a predetermined maximum value. Hypervisor 220 managed the physical memory addresses.

FIG. 3 is a conceptual illustration of a two-part translation lookaside buffer 300 that could be used in the translation from a virtual address to a physical address. A first table 310 includes mappings from virtual addresses to real addresses and a second table 320 includes mappings from real addresses to physical addresses.

However, TLB 300 required serialization and so typically, the logic equivalent of tables 310, 320 was implemented. In TLB 400, a first portion 401 was a field with a value that identified whether the address was a virtual address or a real address, a second portion 402 included either the virtual address or the read address, and a third portion 403 contained the mapping to the corresponding physical address. Thus, with TLB 400, it was possible to go directly from a virtual address to the corresponding physical address, or alternatively from a real address to the corresponding physical address.

An area of emphasis has been on how to minimize the penalty when there is a miss in TLB 400 for a virtual address. Two translations are required; one from the virtual to the real address; and one from the real address to the physical address. The second translation is the one that has received most of the attention.

Either the operating system, or the hypervisor using the operating system state can perform the virtual-to-real address translation. Typically, to do the translation from the real address to physical address translation base and bounds table, a coarse grain translation has been used.

SUMMARY OF THE INVENTION

In one embodiment of the present invention, a method generates a virtual-to-real-to-physical address translation more rapidly than the prior art methods. In particular, the real-to-physical address portion of the translation is accelerated using a translating load operation, which in turn accelerates virtualized partitions.

In one example, hardware determines whether a translation lookaside buffer miss occurred for a virtual address. If a miss occurred, a translating load instruction is executed. Successful execution of the translating load instruction generates a new data portion for a virtual-to-physical address translation table entry.

The execution of the translating load instruction searches a table of translation lookaside buffer entries for a real-to-physical address translation table entry including a real address associated with the virtual address. If such a real-to-physical address translation table entry is found, the execution of the translating load then determines whether permissions and size information in the real-to-physical address translation table entry are compatible with, e.g., are equal to, or a superset of, permissions and size information associated with the real address. If the permissions and size information in the real-to-physical address translation table entry are equal to, or a superset of, permissions and size information associated with the real address, the execution of the translating load instruction creates the new data portion for the virtual-to-physical address translation table entry.

In one embodiment, the table of translation table entries is a hardware translation lookaside buffer. In another embodiment, the table of translation table entries is a translating load table.

In one embodiment, a processor includes a hardware table of translation table entries including real-to-physical translation table entries and a translating load instruction stored in a memory wherein execution of the translating load instruction generates a method as described above. A system includes this processor and a memory coupled to the processor. In one embodiment, the system is a stand-alone computer system, and in another embodiment, the system is a client-server system.

In still another embodiment, a structure includes:
means for determining whether a translation lookaside buffer miss occurred for a virtual address;
means for executing a translating load instruction, following the determining finding the translation lookaside buffer miss occurred, to generate a new data portion for a virtual-to-physical address translation table entry;
means for searching a table of translation lookaside buffer entries for a real-to-physical address translation table entry including a real address associated with the virtual address;
means for determining, following the means for searching finding the real-to-physical address translation table entry, whether permissions and size information in the real-to-physical address translation table entry are compatible with permissions and size information associated with the real address; and
means for creating the new data portion for the virtual-to-physical address translation table entry following the means for determining finding that the permissions and size information in the real-to-physical translation table entry are compatible with the permissions and size information associated with the real address.

Figure 1:
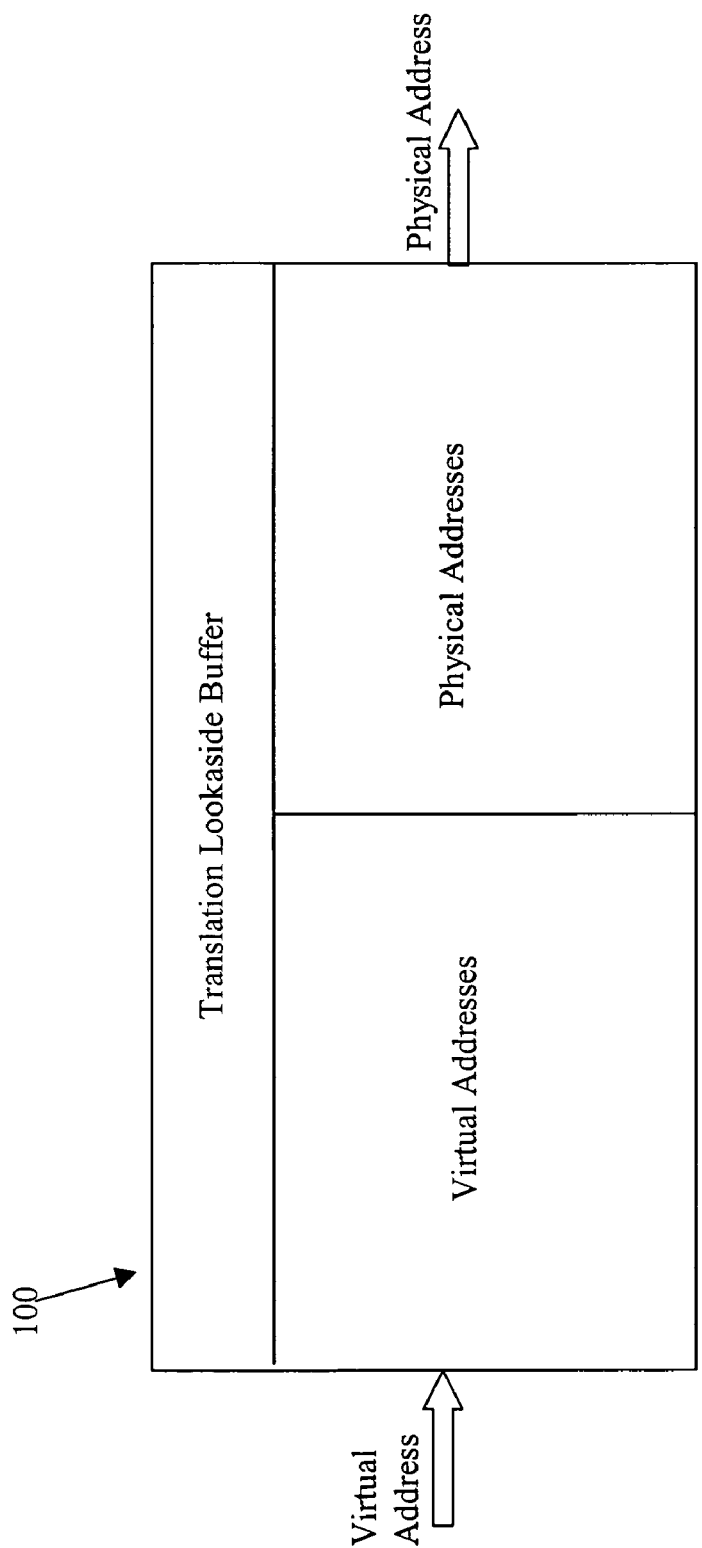
FIG. 1 is a block diagram of a prior art translation lookaside buffer used for mapping a virtual address to a physical address.
Figure 2:
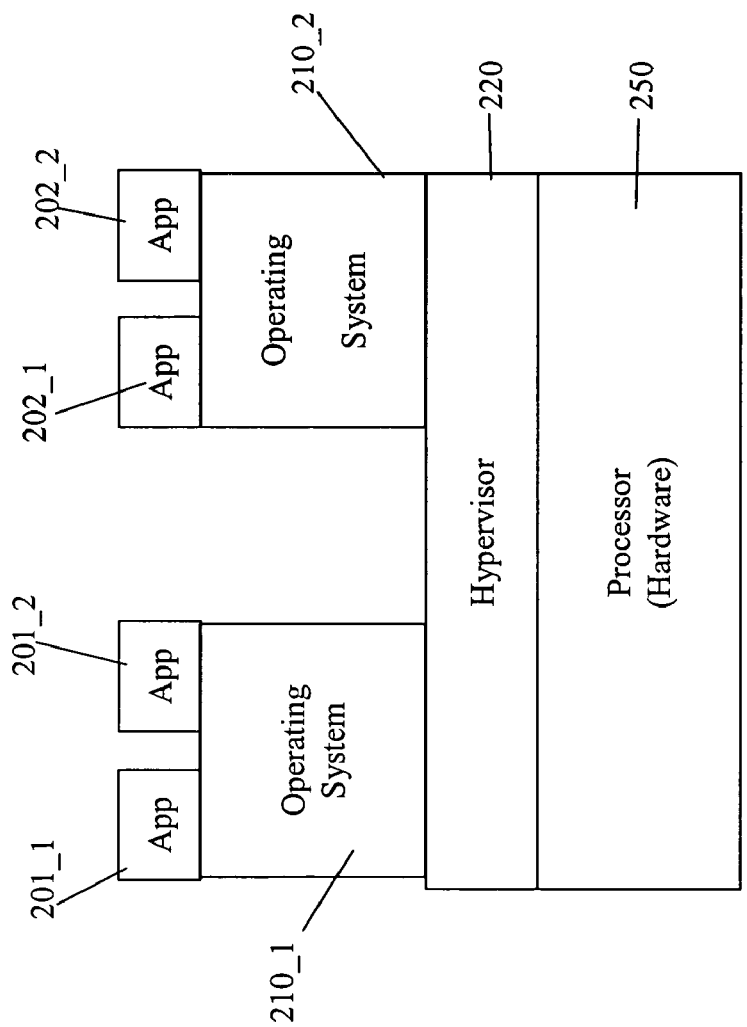
FIG. 2 is a block diagram of a prior art computing platform that utilized logical partitions and so had virtual addresses, real addresses, and physical addresses.
Figure 3:
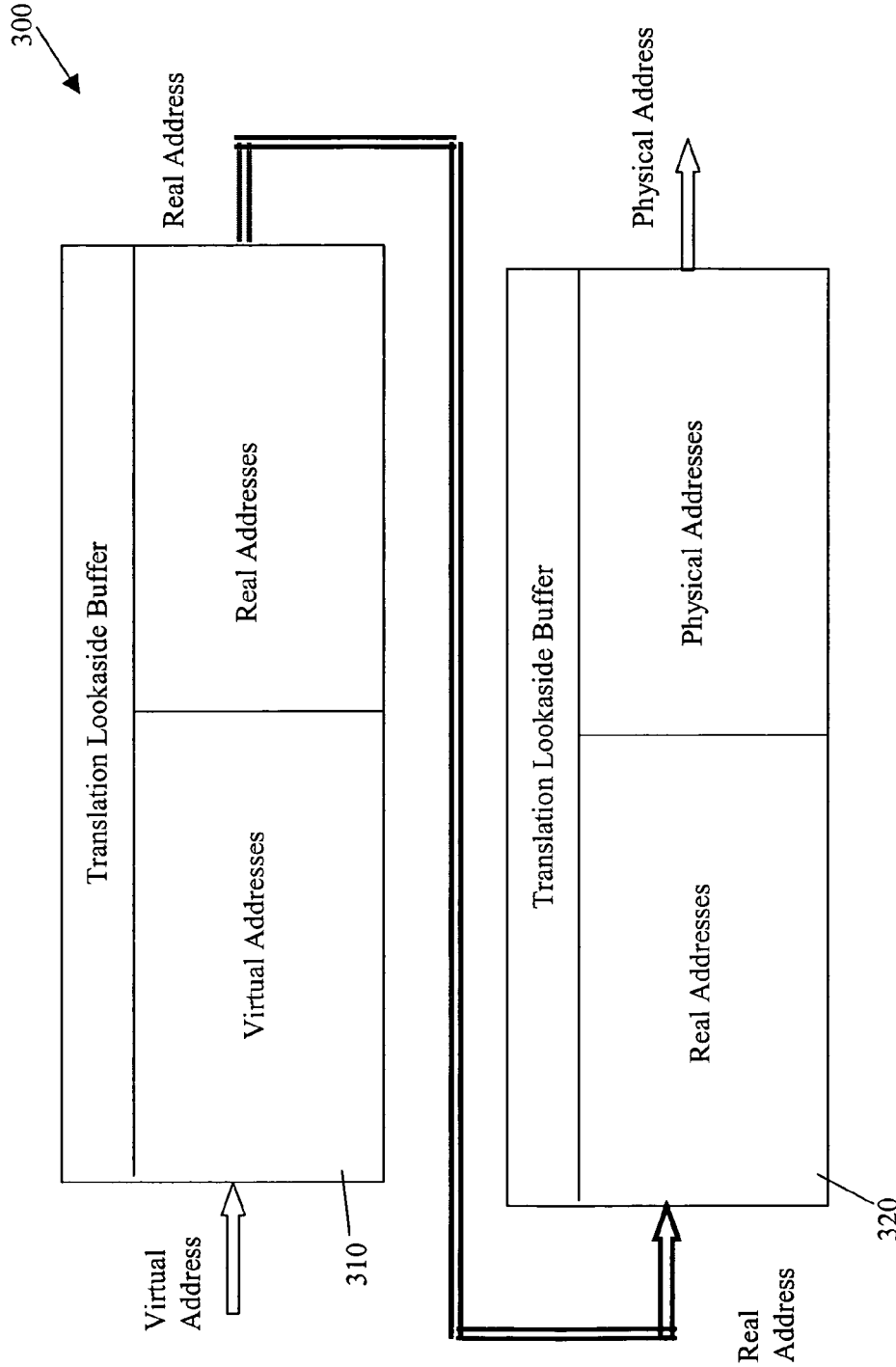
FIG. 3 is a block diagram of a prior art translation lookaside buffer used for mapping a virtual address to a real address and the real address to a physical address.
Figure 4:
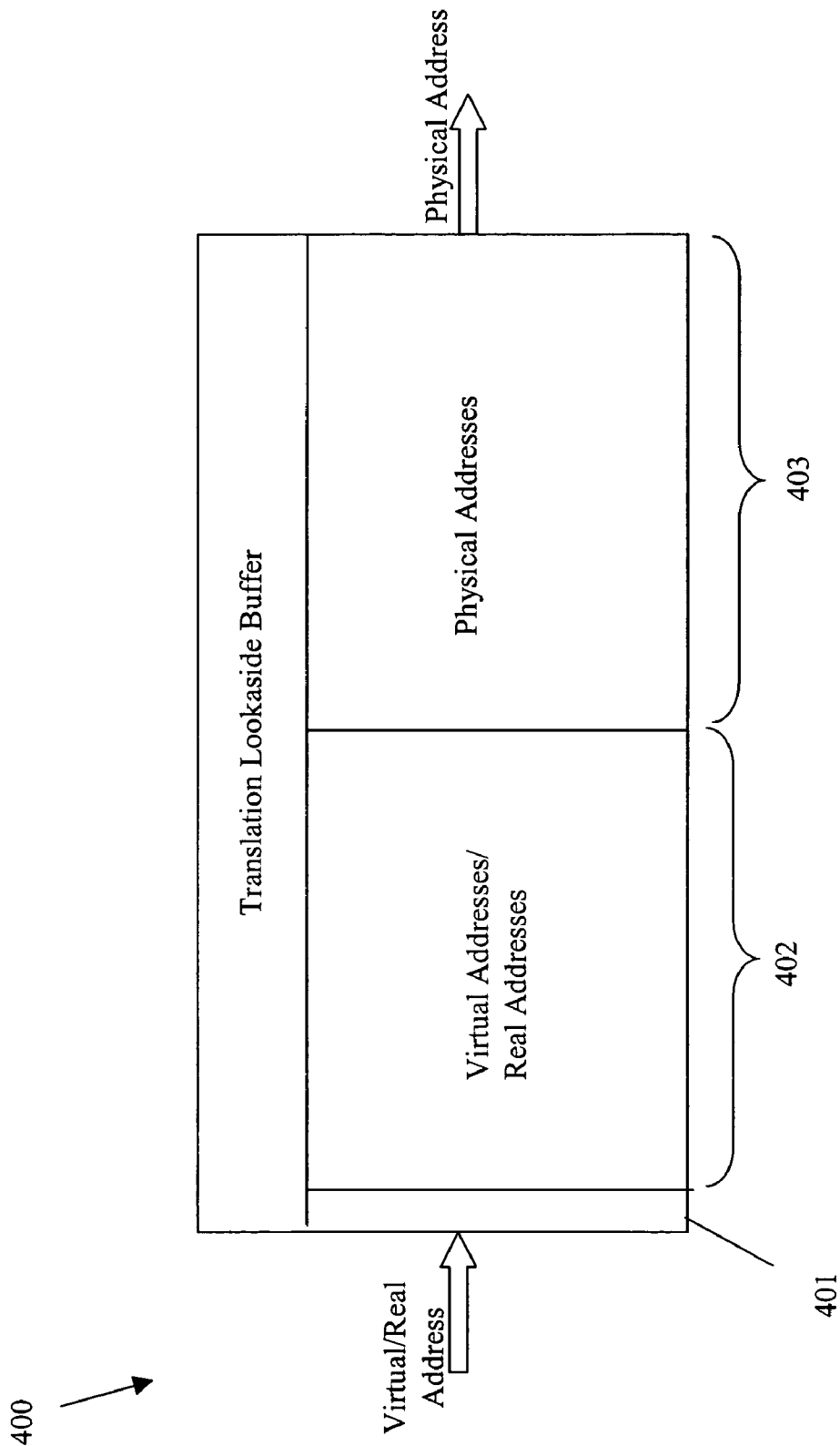
FIG. 4 is a block diagram of a prior art translation lookaside buffer used for mapping a virtual address to a physical address and for mapping a real address to a physical address.
Figure 5:
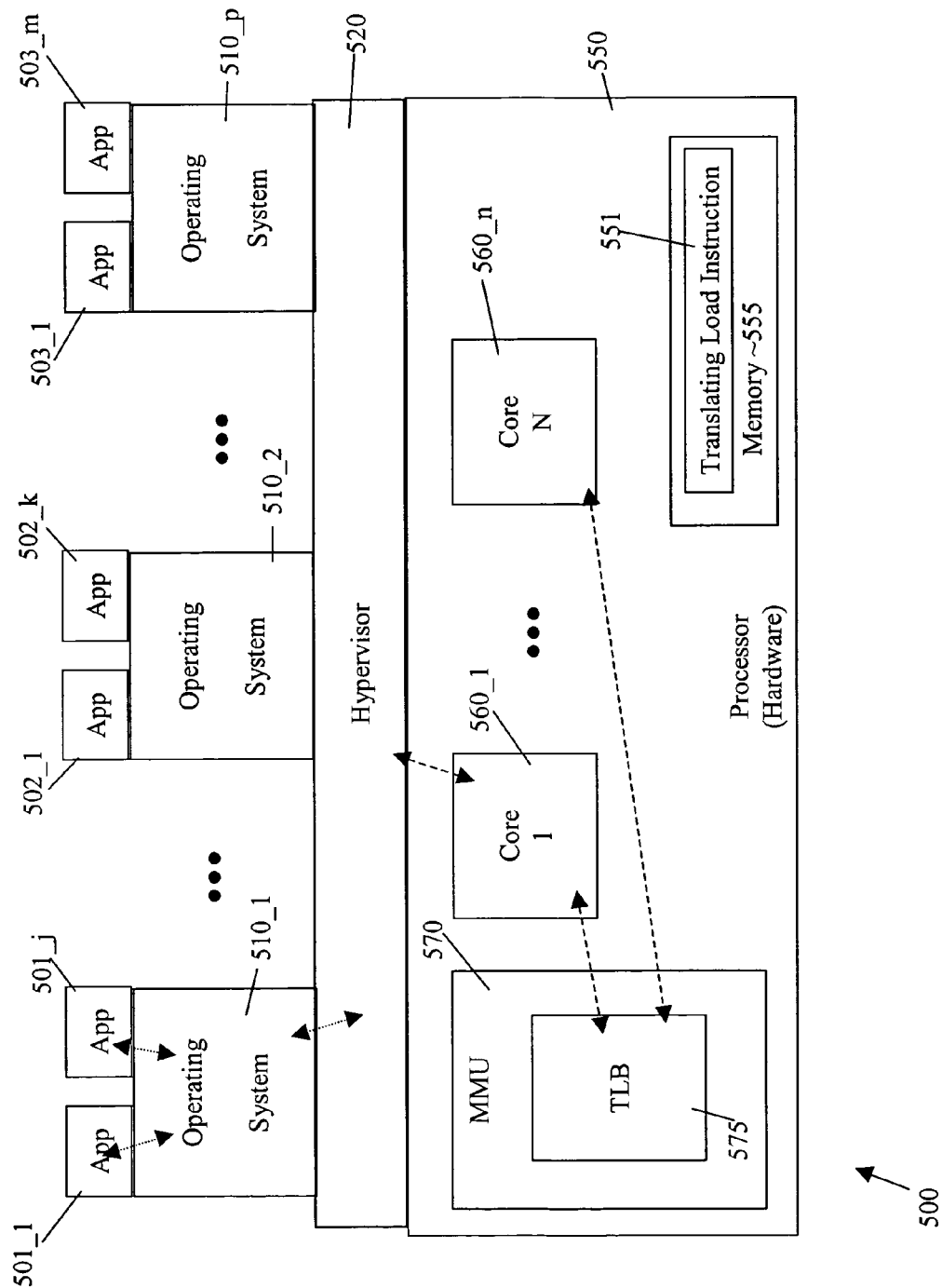
FIG. 5 is a block diagram of a computing platform that includes a translating load instruction, and means for executing the translating load instruction, according to one embodiment of the present invention.

In the drawings and the detailed description, elements with the same reference numeral are the same or equivalent elements. Also, for three digit reference numerals, the first digit of the reference numeral is the figure number in which the corresponding element first appears. For four digit reference numerals, the first two digits of the reference numeral are the figure number in which the corresponding element first appears.

DETAILED DESCRIPTION

In one embodiment of the present invention, a system 500, which includes a processor 550 that includes a plurality of cores 560_1 to 560_n, generates an address translation more efficiently than prior art processors when there is a miss in a translation lookaside buffer (TLB) 575. Hypervisor 520 utilizes a translating load instruction that upon execution on processor 550 generates a data portion of a TLB entry. Execution of the translating load instruction utilizes information from a real-to-physical address translation table entry and information provided in the call to the translating load instruction to synthesize the data portion of a new virtual-to-physical translation table entry.

In this embodiment, system 500 is partitioned into virtual processors. A processor assignment, e.g., one of the plurality of cores 560_1 to 560_n, with respect to an execution environment for a computing application defines the virtual processor for that computing application.

In this embodiment, system 500 includes a plurality of applications 501_1 to 501_j, 502_1 to 502_k, and 503_1 to 503_m, a plurality of operating systems 510_1, 510_2 to 510_p, a hypervisor 520, and a processor 550 that in turn includes a plurality of cores 560_1 to 560_n. A memory management unit 570 of processor 550 includes a translation lookaside buffer 575.

All virtual processors in processor 550 share translation lookaside buffer 575. To assist in defining the execution environment partition identifiers and context identifiers are used in one embodiment. Partition identifiers and context identifiers are coordinated across hypervisor code and all supervisor code respectively across all virtual processors within processor 550.

Translation lookaside buffer 575 provides virtual-to-physical address translations and real-to-physical address translations. All the virtual processors for virtual-to-physical address translations and for real-to-physical address translations use hardware-based translation lookaside buffer 575.

In one embodiment, when a virtual address translation is needed, hardware in processor 550 searches TLB 575 for an appropriate translation table entry. If such an entry is not found, a TLB miss occurs.

Upon a TLB miss, processing transfers from TLB miss check operation 695 (FIG. 6) to a get virtual address to real address translation table entry operation 601. In one embodiment, MMU 570 also includes a Translation Storage Buffer (TSB), which is a translation table in memory. The TSB contains one-level mapping information for virtual addresses to real addresses. Hardware in processor 550 looks up the TSB when a translation cannot be found in TLB 575. A TSB entry is called a Translation Table Entry, or TTE.

Use of a TSB is illustrative only and is not intended to limit the invention to this specific embodiment. Either an operating system, or hypervisor 520 using the state of the operating system can generate a virtual to real address translation using for example a page table.

Figure 7A:
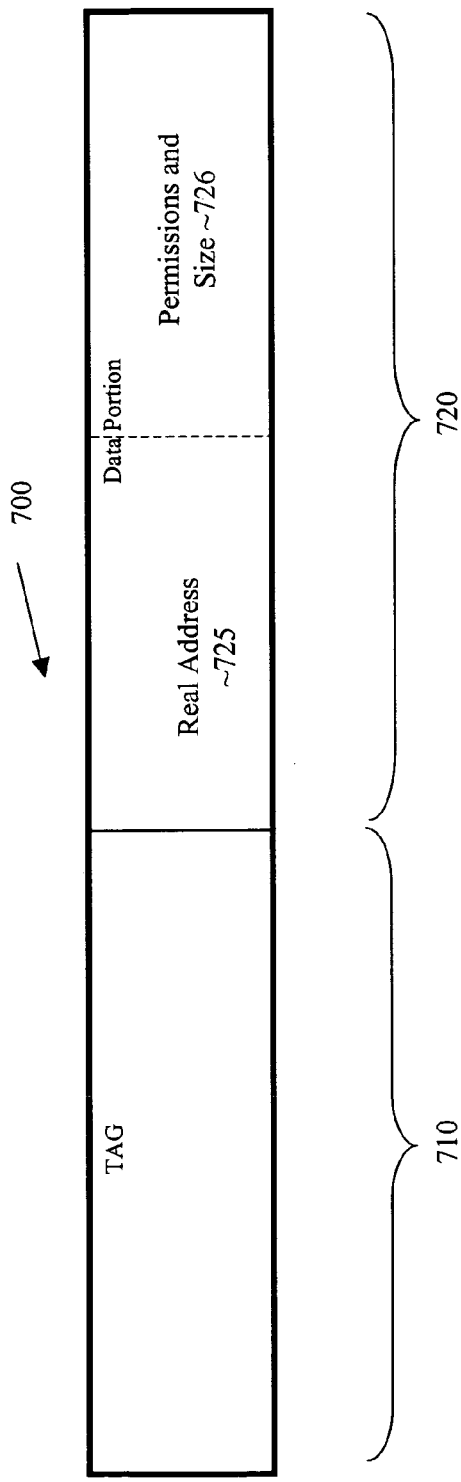
FIG. 7A is an illustration of a memory structure that is a virtual-to-real address translation table entry used in one embodiment of the present invention.

FIG. 7A illustrates one embodiment of a TTE 700 for a virtual-to-real address translation. TTE 700 has two portions: a tag portion 710 and data portion 720. Data portion 720 includes a real address field 725 that contains a real address that is associated with the virtual address in tag portion 710, and permissions and size field 726 that contains permissions and size information associated with the real address.

Figure 7B:
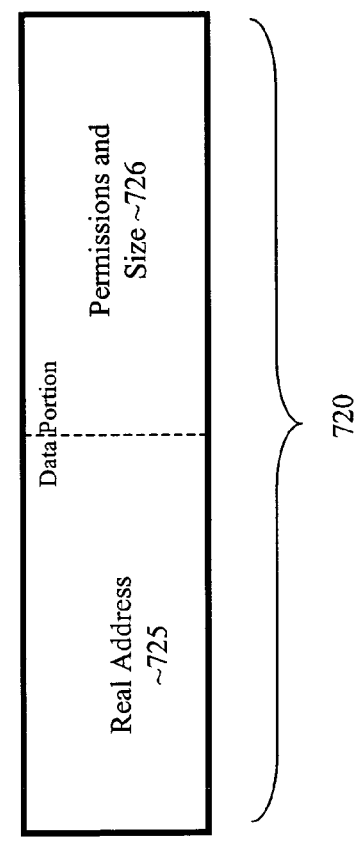
FIG. 7B is an illustration of a memory structure that is a data portion of the virtual-to-real address translation table entry of FIG. 7A and is passed as an argument in the translating load instruction in one embodiment of the present invention.

Upon completion of operation 601, a TTE 700 is obtained for the virtual address for which there was a TLB miss. Hypervisor 520 initiates execution of a translating load instruction 551 that is stored in a memory 555, e.g., in firmware. Data portion 720 (FIG. 7B) of TTE 700 is passed in the call to translating load instruction 551.

Figure 8:
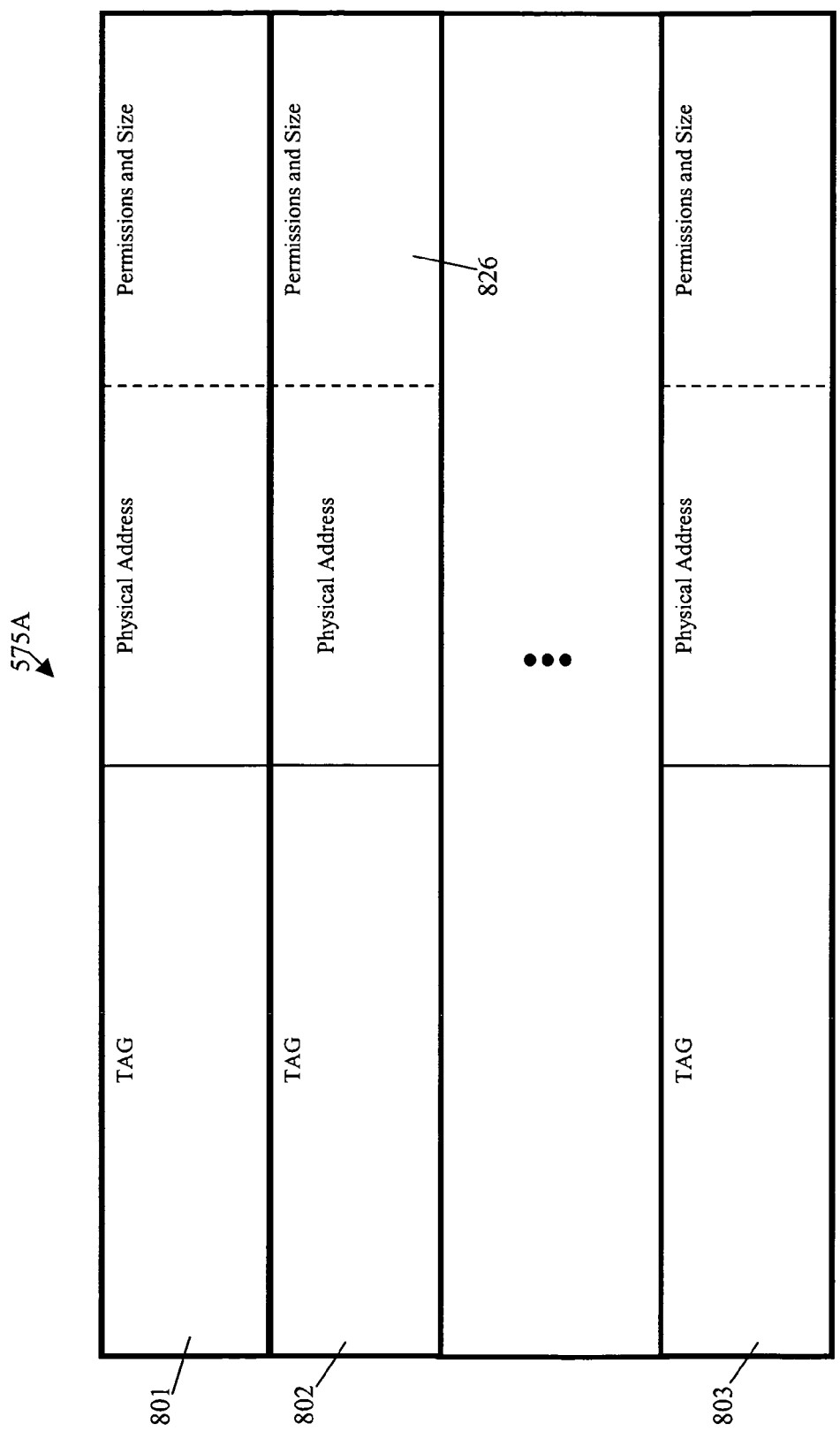
FIG. 8 is a diagram of translation table entries in a translation lookaside buffer in one embodiment of the present invention.

Execution of translating load instruction 551 results in performance of method 600. Specifically, a search table for real address in translation table entry (TTE) data portion operation 602 is provided with data portion 720 (FIG. 7B) that includes a real address, in real address field 725, which is associated with, e.g., corresponds to, the virtual address for which the TLB miss occurred. With this real address, operation 602 searches, for example, TLB 575A (FIG. 8) for a real-to-physical address translation table entry with a translation from the real address in data portion 720 to a physical address.

Figure 9:
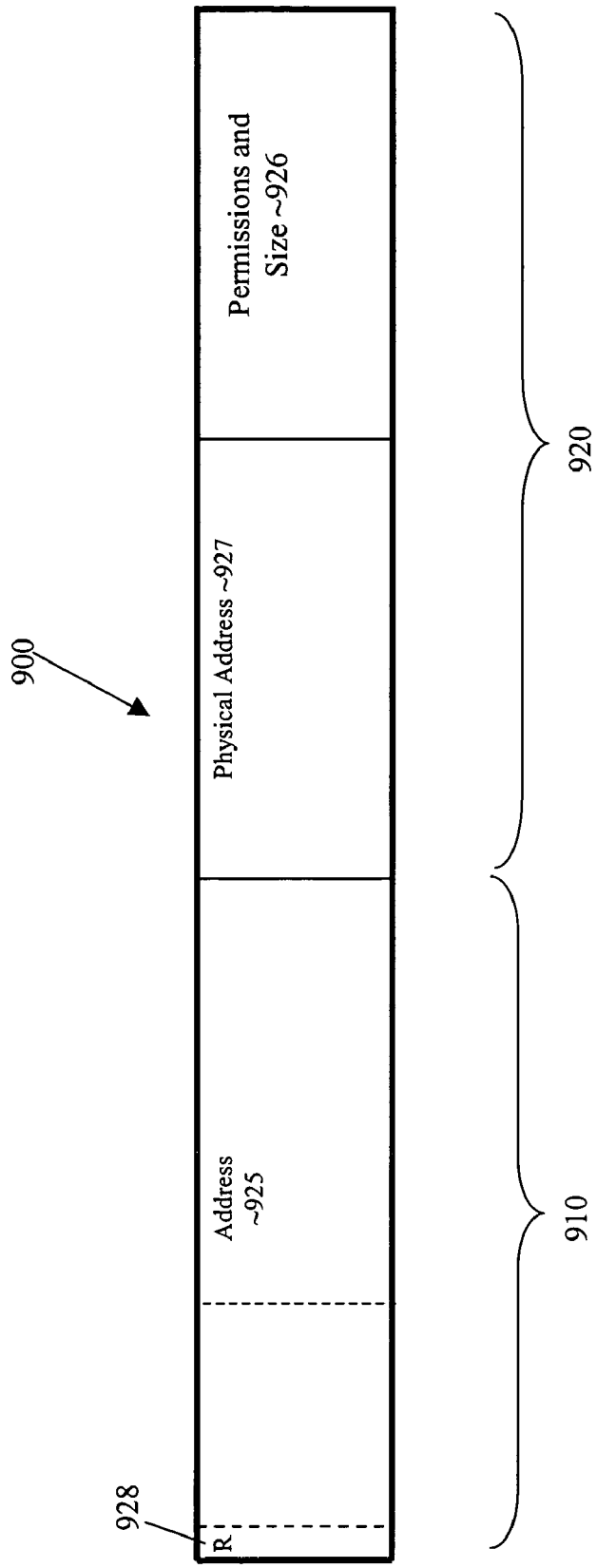
FIG. 9 is a more detailed diagram of the translations table entries of FIG. 8, according to one embodiment of the present invention.

In this example, TLB 575A includes a plurality of translation table entries 801 to 803. FIG. 9 is a more detailed illustration of one embodiment of a translation table entry 900 that is representative of each of the plurality of translation table entries 801 to 803.

Figure 6:
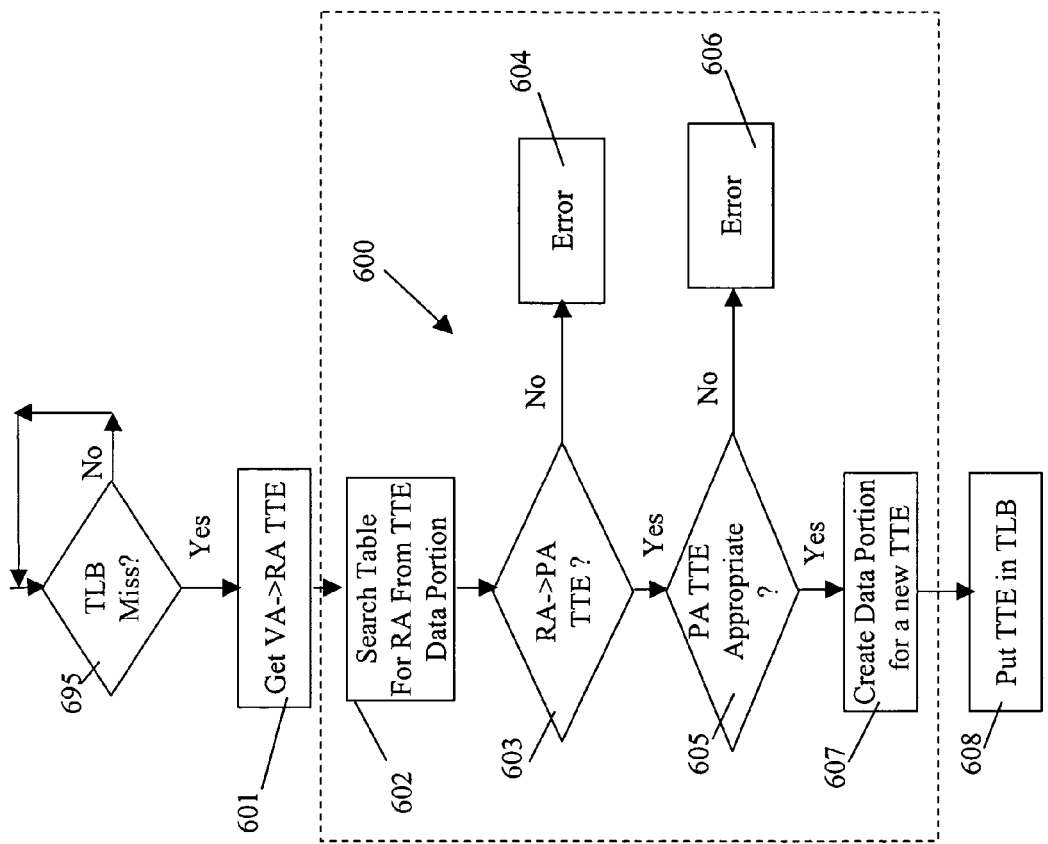
FIG. 6 is a process flow diagram for a method of generating a virtual-to-physical address translation table entry for the computing platform of FIG. 5, according to one embodiment of the invention.

Translation table entry 900 includes a tag portion 910 and a data portion 920. In this example, tag portion 910, sometimes called tag 910, includes a real field 928 and an address field 925. A value in real field 928 indicates whether translation table entry 900 is for a real-to-physical address translation, or alternatively for a virtual-to-physical address translation and consequently identifies the type of address in address field 925. Data portion 920 includes a physical address field 927 that includes a physical address associated with the address in field 925, and a permissions and size field 926 that contains information associated with the physical address in field 927. Upon completion, operation 602 transfers processing to real-to-physical address translation table entry found check operation 603 (FIG. 6).

If a real-to-physical address translation table entry was not found for real address 725, check operation 603 transfers processing to error operation 604. Error operation 604 returns a predefined value, e.g., zero, which indicates that method 600 was not successful for the virtual address that resulted in the TLB miss.

If a real-to-physical address translation table entry was found for real address 725, e.g., entry 802 (FIG. 8), check operation 603 transfers processing to physical address in TTE appropriate check operation 605. Check operation 605 compares the permissions and size information in field 726 of data portion 720 of virtual-to-physical address TTE 700 with the permissions and size information in field 820 of real-to-physical address TTE 802.

If the permissions and size information in field 826 are equal to, or a superset of, the permissions and size information of field 726, check operation 605 transfers processing to create data portion of translation table entry operation 607, and otherwise to error operation 606.

If processing transferred to error operation, the information characterizing the memory associated with the physical address indicated that the memory was not appropriate for use with the virtual address. Accordingly, error operation 604 returns a value, e.g., zero, which indicates that method 600 was not successful for the virtual address that resulted in the TLB miss.

In create data portion of TTE operation 607, a translation table entry data portion for a real-to-physical address translation table entry is generated. In one embodiment, permissions and size information in field 726 is used with the physical address in TTE 802 to form a new data portion of a virtual-to-physical address TTE. This new data portion is stored and the translating load instruction completes.

The tag for the new virtual-to-physical address TTE is known and is the information associated with the original virtual address for which the TLB miss occurred. The known tag for the new virtual-to-physical address TTE along with the new data portion from operation 607 are written to TLB 575A in put TTE in TLB operation 608 to form a virtual-to-physical address translation table entry.

The above embodiments may be used with any processor having a TLB, and the capability to implement the operations described. The use of a translating load instruction to initiate method 600 is illustrative only and is not intended to limit the invention to initiating method 600 via execution of only a load instruction.

In one embodiment, the call to the translating load instruction is of the form:

TL [Source Reg] [Destination Reg] where,
Source register holds the data portion of a virtual-to-real address TTE; and
a data portion for a new virtual-to-physical address TTE is returned in the destination register if execution if successful and otherwise a predefined value is loaded in the destination register.

Thus, in this embodiment, the destination register is tested upon completion of operation 607 and if the destination register does not contain the predefined value, operation 608 is performed. If the destination register does contain the predefined value, the virtual-to-physical address translation can be performed using the prior art methods for example.

Figure 10:
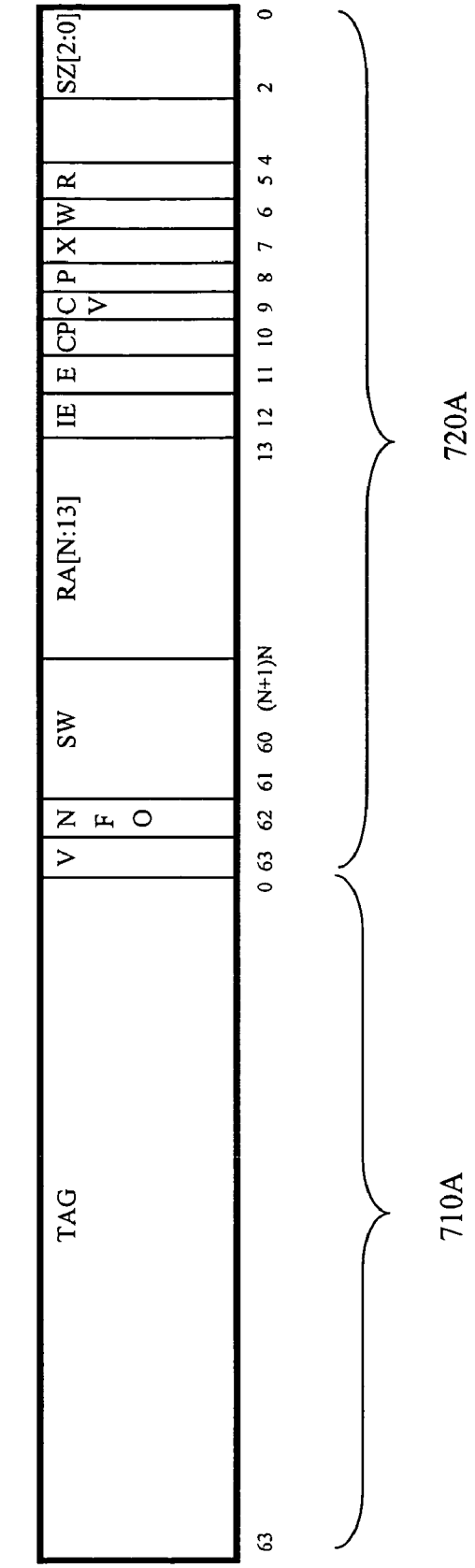
FIG. 10 is a more detailed illustration of a memory structure that is a virtual-to-real address translation table entry used in one embodiment of the present invention.

FIG. 10 illustrates a more detailed embodiment of a virtual-to-real address TTE 1000 with a tag portion 710A and a data portion 720A. In this embodiment, data portion 720A is used as the source in the translating load instruction TL. Table 1 is one embodiment of definitions of the fields in TTE 1100 and the data contained in the fields. In column Bit, a T is used to denote the tag portion and a D is used to denote the data portion. In the Field Names, bold is used to denote the characters used as the reference numeral for that field in FIG. 10.

TABLE 1

| Bit | Field | Description |
| --- | --- | --- |
| T-63:48 | Context | If R is 1, this entry maps a real address to a physical address and the context information is ignored. If R is 0, this entry maps a virtual address to a real address. |
| T-47:42 | | Reserved |
| T-41:00 | Virtual Address | Virtual Address Tag. The virtual page number. Bits 21 through 13 are not maintained in the tag because these bits index the minimally sized, direct mapped TSB of 512 entries. |
| D-63 | Valid | If this valid bit is set to 1, this TTE is a valid entry |
| D-62 | Non-Faulting Only | If this non-faulting only bit is set to 1, this TLB entry is intended to match only non-faulting address space identifiers |
| D-61:N + 1 | SW | Software usable bits |
| D-N:13 | Real Address | This field provides support for 47 bits of real address. For page sizes larger than 8 KB, the lower order address bits below the page size are ignored. |
| D-12 | Invert Endianness | |
| D-11 | Side Effect | If this side effect bit is set, speculative loads trap for addresses within the page. Non-cacheable memory addresses, other than block loads and stores are strongly ordered against other side effect bit accesses and non-cacheable stores are not merged. This bit should be set for pages that map I/O devices having side effects. The side effect bit does not prevent normal instruction prefetching. This bit has no effect for instruction fetches. The side effect bit does not force non-cacheable access. It is expected, but not required that the CP and CV bits are cleared to zero along with the side effect bit. If both the CP and CV bits are set to one along |

TABLE 1-continued

| Bit | Field | Description |
| --- | --- | --- |
| | | with the side effect bit, the result is undefined. The side effect bit and the NFO bit are mutually exclusive: both bits should never be set in any TTE. |
| D-10:9 | Cacheable Physical and Cacheable Virtual | These two bits are passed to the cache memory sub-system on any access and determine the cacheability of that access as follows: If CP is set to 1, the mapped data or instructions may be cached in any physically indexed cache; If CP and CV are both set to 1, the mapped data or instructions may be cached in any physically or virtually index cache; and If CP is cleared to 0, the contents of the mapped page are non-cacheable. |
| D-8 | Privileged | If this privileged bit is set to one, this mapping only matches in the TLB if the processor is in the privileged mode. |
| D-7 | EXecute | If this execute bit is set to one, instructions may be fetched and executed from this page. |
| D-6 | Writable | If this writable bit is set to one, data mapped by this page may be written to. |
| D-5 | Readable | If this readable bit is set to one, data mapped by this page may be read from. |
| D-4 | SW | Software usable bit |
| D-3: | — | Reserved |
| D-2:0 | Page Size | 000 = 8 KB, 001 = 64 KB, 010 = 512 KB, 011 = 4 MB, 100 = 32 MB, 101 = 256 MB, 110 = 2 GB, 111 = 16 GB |

Figure 11:
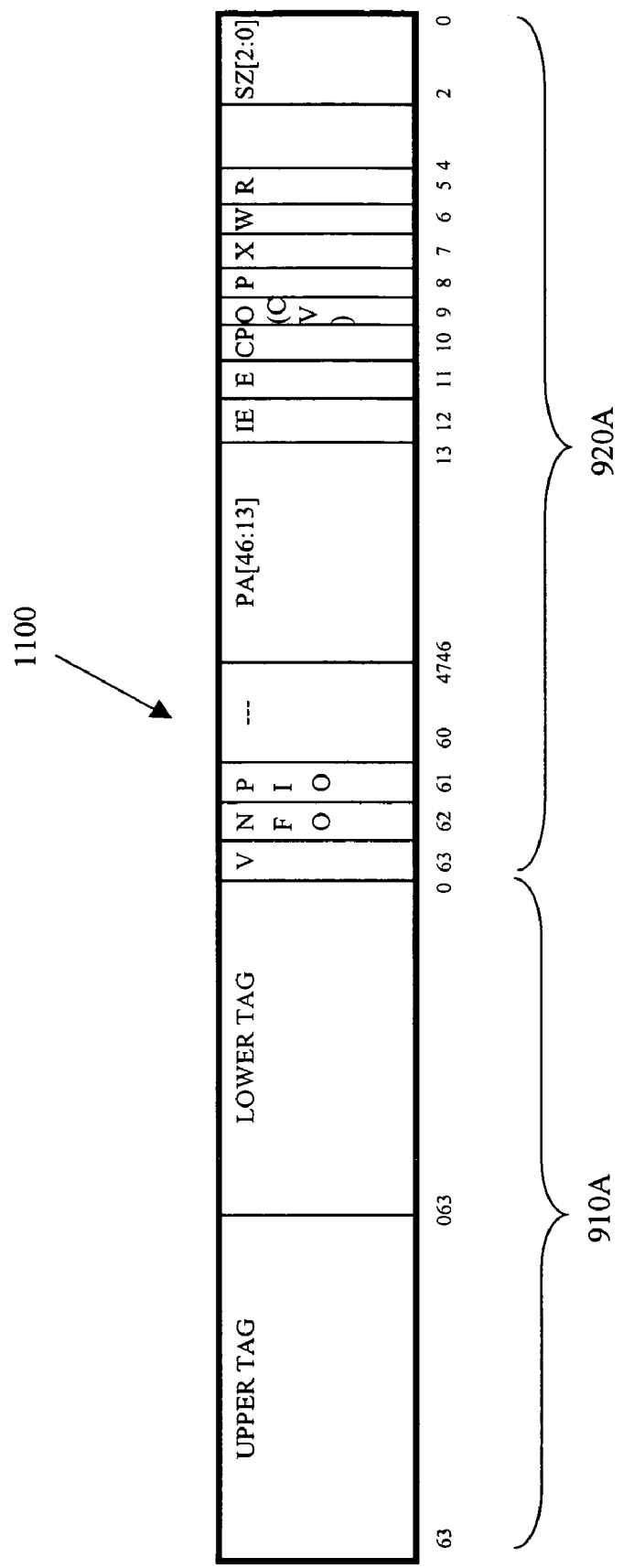
FIG. 11 is a more detailed illustration of a memory structure that is translation table entry used in a translation lookaside buffer and in a translating load table according to one embodiment of the present invention.

FIG. 11 illustrates one embodiment of a TTE 1200 for TLB 575A with a tag portion 910A and a data portion 920A. Table 2 is one embodiment of definitions of the fields in TTE 1100 and the data contained in the fields. In column Bit, a UT is used to denote an upper part of the tag portion; a LT is used denote a lower part of the tag portions; and a D is used to denote the data portion. In the Field Names, bold is used to denote the characters used as the reference numeral for that field in FIG. 11.

TABLE 2

| Bit | Field | Description |
| --- | --- | --- |
| UT-63 | Real | If R is 1, this entry maps a real address to a physical address and the context information is ignored. If R is 0, this entry maps a virtual address to a real address. |
| UT-62:40 | — | — |
| UT-39:32 | Partition | 8-bit Partition ID used for all translation matches |
| UT-31:25 | — | — |
| UT-24 | Select | 1-bit Select field to determine which virtual |

TABLE 2-continued

| Bit | Field | Description |
|---|---|---|
| | | processor context value to compare TLB Entry context against for a primary/secondary context translation. For nucleus context translations, the Context Field should be zero and the value of Select should be set to 00. For a real address to physical address translation, Context Field should be zero and the value of Select should be set to 0.<br>0 = Compare context against primary/secondary context.<br>1 = Compare context against primary/secondary shared context. |
| UT-23:16 | — | — |
| UT-15:0 | Context | A 16-bit context identifier associated with this TLB entry. For a real address to physical address translation this field should be set to zero, otherwise the behavior of the match is undefined. |
| LT-63:13 | Address | If R = 1, Real Address Tag. If R = 0, Virtual Address Tag. For page sizes larger than 8 KB, the appropriate lower order bits are ignored for tag compares and reads to these lower order bits are undefined. |
| LT-12:00 | — | — |
| D-63 | Valid | If this valid bit is set to 1, this TLB entry is a valid entry. |
| D-62 | Non-Faulting Only | If this non-faulting only bit is set to 1, this TLB entry is intended to match only loads using the non-faulting ASIs. |
| D-62 | PIO address space | If this PIO address space bit is set to 1, this TLB entry corresponds to the PIO address space. If this PIO address space bit is set to 0, this TLB entry corresponds to the memory address space. |
| D-60:47 | — | — |
| D-46:13 | Physical Address | This physical address field provides support for 47 bits of physical address. For page sizes larger than 8 KB, the lower order address bits below the page size are ignored. |
| D-12 | Invert Endianness | |
| D-11 | Side Effect | If this side effect bit is set, speculative loads trap for addresses within the page. Non-cacheable memory addresses, other than block loads and stores are ordered against other side effect bit accesses and non-cacheable stores are not merged. This bit should be set for pages that map I/O devices having side effects.<br>The side effect bit does not prevent normal instruction prefetching. This bit has no effect for instruction fetches.<br>The side effect bit does not force non-cacheable access. It is expected, but not required that the CP and CV bits are cleared to zero along with the side effect bit. If both the CP and CV bits are set to one along with the side effect bit, the result is undefined.<br>The side effect bit and the NFO bit are mutually exclusive: both bits should never be set in any TLB entry. |
| D-10 | Cacheable Physical | The state of this bit determines the cacheability of the access as follows:<br>IF the cacheable physical bit is set to 1, the mapped data or instructions may be cached in any of the processor caches, because in this embodiment all caches in the processor are physically-indexed physically tagged. |
| D-9 | Cacheable Virtual | This bit is hardwired to zero, because in this embodiment all caches in the processor are physical. The bit is read as a zero and is write ignore. |
| D-8 | Privileged | If this privileged bit is set to one, this mapping only matches in the TLB if the processor is in the privileged mode. |
| D-7 | EXecute | If this execute bit is set to one, instructions may be fetched and executed from this page. |
| D-6 | Writable | If this execute bit is set to one, data mapped by this page may be written to. |
| D-5 | Readable | If this execute bit is set to one, data mapped by this page may be read from. |
| D-4:3 | — | — |
| D-2:0 | Page Size | 000 = 8 KB, 001 = 64 KB, 010 = 512 KB, 011 = 4 MB, 100 = 32 MB, 101 = 256 MB, 110 = 2 GB, 111 = 16 GB |

In this embodiment, shared TLB 575A has 8K entries (2^13) and supports page sizes from 8 KB through 16 GB. TLB 575A is used for both virtual address to physical address translation and real address to physical address translation. In one embodiment, TLB 575A is banked into four physical banks. The TLB is 16-way set associative. Thus, each bank has 2048 entries organized as 128 sets.

For accessing TLB entries a set of three buffer registers are used. These three registers hold the TLB entries upper tag portion, lower tag portion and data portion, respectively. There is a TLB access operation that reads a TLB entry into the three buffer registers and a TLB access operation that writes the two tag registers plus the data of the store into a TLB entry.

Figure 12:
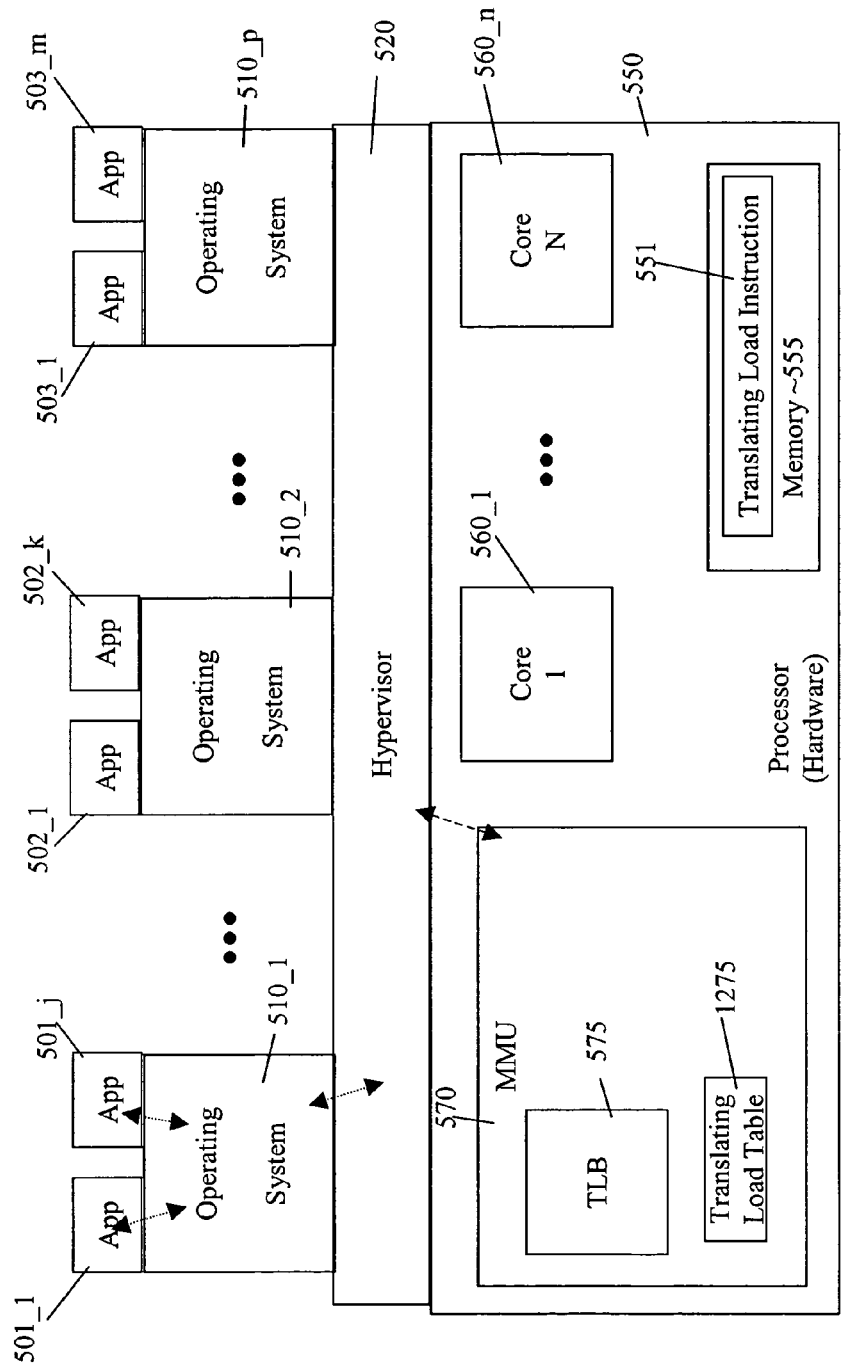
FIG. 12 is a block diagram of a computing platform that includes a translating load instruction, and means for executing the translating load instruction and a translating load table used in the execution, according to one embodiment of the present invention.

A small, per micro-core table of TLB entries, called a translating load table 1275 (FIG. 12), is used to accelerate the two step translation required for virtual-to-real-to-physical translation, as illustrated in FIG. 6 in one embodiment.

Either the full TLB or a smaller dedicated table can be used in method 600. Here, a smaller table is used to achieve better performance. In one embodiment, translating load table 1275 is a small fully associative table of sixteen entries containing TLB entries for real-to-physical address translation. The table is only used for translating load operations.

The execution of the translating load instruction performs a lookup in the special translating load table in operation 602. The 64-bit address used for this load operation is interpreted as being the TTE data portion of a virtual-to-real TTE. The TLB is accessed in operation 602 to look for a corresponding TLB entry that performs the real-to-physical address translation.

For performing the TLB lookup, the upper two bits, bits 63 and 62, of data portion 702A are masked to zero to form a real address. This real address is sent to the TLB in accordance with a Real Address Page Size Register. If a TLB miss occurs the Real-to-Physical translating load returns the value zero. If a TLB hit is found, e.g., TTE 1100 has the correct real address in the tag, the following set of checks are performed in operation 605:

Address.Sz<=TLBentry.Sz
Address.R<=TLBentry.R
Address.W<=TLBentry.W
Address.X<=TLBentry.X
Address.CP==TLBentry.CP
Address.E==TLBentry.E
Address.IE==TLBentry.IE Here, "Address" refers to the data portion 720A of TTE 1000 (FIG. 10), and "TLBentry" refers to data portion 920A of TTE 1100 (FIG. 11). The letter after a period is the reference numeral in FIG. 10 or FIG. 11. Thus, the size, the readability, the writeablity, the execution ability, Endiannes, side effect, and cacheability are checked. If the real-to-physical TTE has properties that are equal to or a superset of those in the virtual-to-real address TTE the data portion for a new virtual-to-physical address TTE is returned in operation 607, as described above.

In one embodiment, processor 550A is included in a hardware configuration 1310 like a personal computer or workstation. In this embodiment, the applications and operating system(s) are included in memory 1312 or a memory coupled to processor 550A via the Internet for example. Hardware configuration 1310 includes, but is not limited to, an I/O interface 1314, a display 1316, a keyboard 1314, and a mouse 1318.

However, in another embodiment, system 1310 is part of a client-server computer system 1300. In this embodiment, server system 1380 includes a processor 500B as well as a display 1381, memory 1384, and a network interface 1383.

Figure 13:
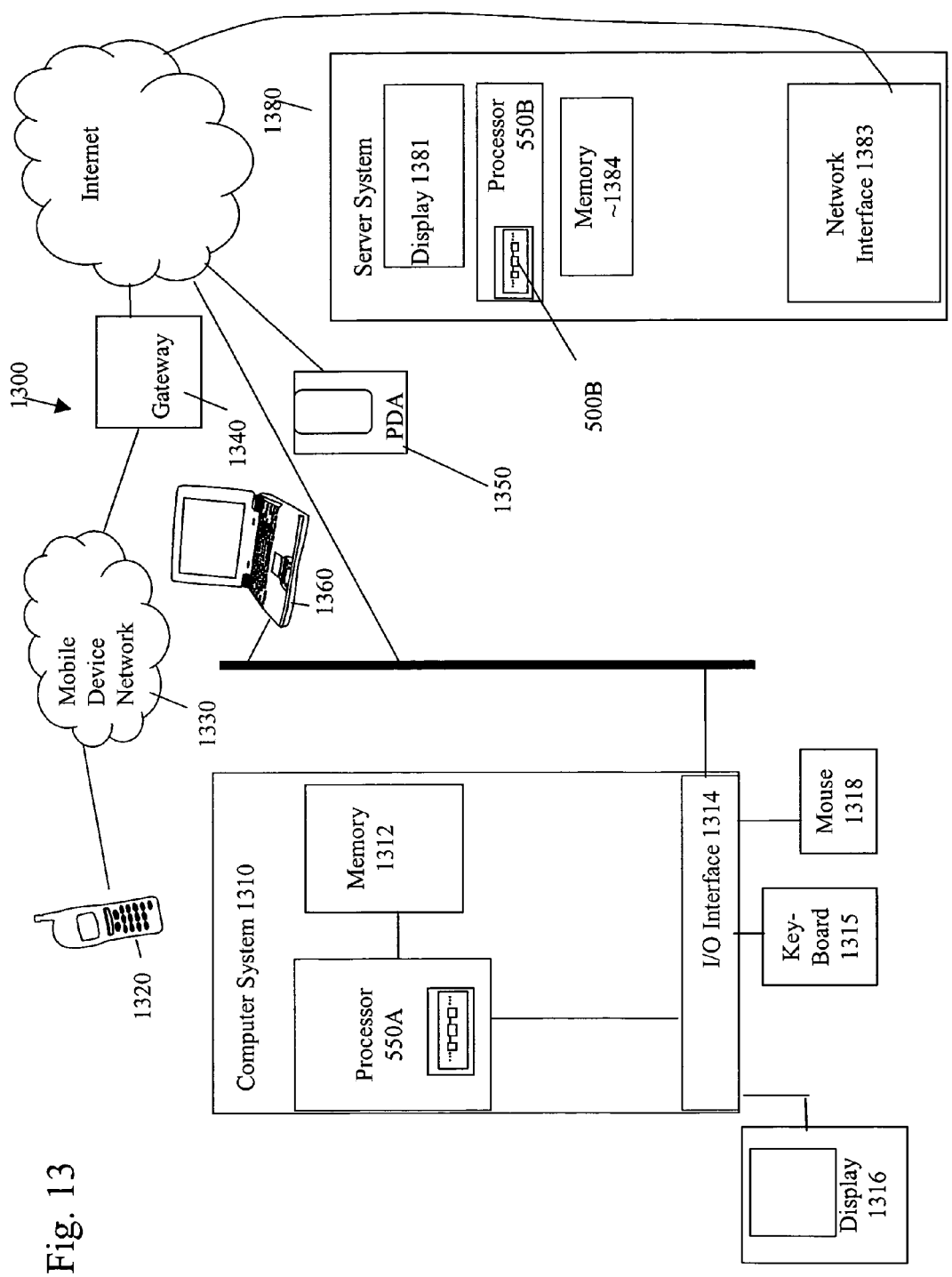
FIG. 13 is a diagram of a system and of systems that utilize the processor with the translating load instruction according to various embodiments of the present invention.

For either a client-server computer system 1300 or a stand-alone computer system 1310, memory 1312 typically includes both volatile memory, such as main memory, and non-volatile memory, such as hard disk drives. While memory 1312 is illustrated as a unified structure in FIG. 13, this should not be interpreted as requiring that all memory in memory 1312 is at the same physical location. All or part of memory 1312 can be in a different physical location than processor 550A.

More specifically, processor 550, in one embodiment, can be included in a portable computer, a workstation, a server computer, or any other device. Similarly, in another embodiment, system 1300 can be comprised of multiple different computers, wireless devices, server computers, or any desired combination of these devices that are interconnected to perform the operations, as described herein.

Herein, a computer program product comprises a medium configured to store or transport computer readable code or in which computer readable code for a method is stored. Some examples of computer program products are CD-ROM discs, ROM cards, floppy discs, magnetic tapes, computer hard drives, servers on a network and signals transmitted over a network representing computer readable program code.

Herein, a computer memory refers to a volatile memory, a non-volatile memory, or a combination of the two. Similarly, a computer input unit 1316 and a display unit 1315 refer to the features providing the required functionality to input the information described herein, and to display the information described herein, respectively, in any one of the aforementioned or equivalent devices.

In view of this disclosure, the translating load functionality can be implemented in a wide variety of computer system configurations using an operating system and computer programming language of interest to the user.

While the translating load hereinbefore has been explained in connection with one embodiment thereof, those skilled in the art will readily recognize that modifications can be made to this embodiment without departing from the spirit and scope of the present invention.

For example, in one embodiment, a structure includes:
means for determining whether a translation lookaside buffer miss occurred for a virtual address;
means for executing a translating load instruction, following the determining finding the translation lookaside buffer miss occurred, to generate a new data portion for a virtual-to-physical address translation table entry;
means for searching a table of translation lookaside buffer entries for a real-to-physical address translation table entry including a real address associated with the virtual address;
means for determining, following the means for searching finding the real-to-physical address translation table entry, whether permissions and size information in the real-to-physical address translation table entry are compatible with permissions and size information associated with the real address; and
means for creating the new data portion for the virtual-to-physical address translation table entry following the means for determining finding that the permissions and size information in the real-to-physical translation table entry are compatible with the permissions and size information associated with the real address.

In still yet another embodiment, a structure includes:
means for determining whether a translation lookaside buffer miss occurred for a virtual address;
means for finding, following the means for determining finding the translation lookaside buffer miss occurred, a virtual-to-real address translation table entry for the virtual address wherein the virtual-to-real address translation table entry comprises a data portion including (i) the real address; and (ii) permissions and size information;
means for executing a translating load instruction having the data portion as an argument to generate a new data portion for a virtual-to-physical address translation table entry; and
means for using the new data portion in a virtual-to-physical address translation table entry for the virtual address.

This disclosure provides exemplary embodiments of the present invention. The scope of the present invention is not limited by these exemplary embodiments. Numerous variations, whether explicitly provided for by the specification or implied by the specification, may be implemented by one of skill in the art in view of this disclosure.

We claim:

1. A computer-based method comprising:
   determining whether a translation lookaside buffer miss occurred for a virtual address; and
   executing a translating load instruction, following the determining finding the translation lookaside buffer miss occurred, to generate a new data portion for a virtual-to-physical address translation table entry.

2. The computer-based method of claim 1 wherein the executing the translating load instruction further comprises:
   searching a table of translation lookaside buffer entries for a real-to-physical address translation table entry including a real address associated with the virtual address.

3. The computer-based method of claim 2 wherein the executing the translating load instruction further comprises:
   determining, following the searching finding the real-to-physical address translation table entry, whether permissions and size information in the real-to-physical address translation table entry are compatible with permissions and size information associated with the real address.

4. The computer-based method of claim 3 wherein the executing the translating load instruction further comprises:
   creating the new data portion for the virtual-to-physical address translation table entry following the determining finding that the permissions and size information in the real-to-physical translation table entry are compatible with the permissions and size information associated with the real address.

5. The computer-based method of claim 2 wherein the table is a hardware translation lookaside buffer.

6. The computer-based method of claim 2 wherein the table is a translating load table.

7. A computer-based method comprising:
   searching a table of translation lookaside buffer entries for a real-to-physical address translation table entry including a real address associated with a virtual address for which a translation lookaside buffer miss occurred; and
   determining, following the searching finding the real-to-physical address translation table entry, whether permissions and size information in the real-to-physical translation table entry are compatible with permissions and size information associated with the real address.

8. The computer-based method of claim 7 further comprising:
   creating a new data portion for a virtual-to-physical address translation table entry following the determining finding that the permissions and size information in the real-to-physical translation table entry are compatible with the permissions and size information associated with the real address.

9. The computer-based method of claim 7 wherein the creating further comprises:
   using a physical address from the real-to-physical address translation table entry, and using the permissions and size information associated with the real address to create the new data portion.

10. The computer-based method of claim 7 wherein the table is a hardware translation lookaside buffer.

11. The computer-based method of claim 7 wherein the table is a translating load table.

12. A computer-based method comprising:
    determining whether a translation lookaside buffer miss occurred for a virtual address;
    finding, following the determining finding the translation lookaside buffer miss occurred, a virtual-to-real address translation table entry for the virtual address wherein the virtual-to-real address translation table entry comprises a data portion including (i) a real address; and (ii) permissions and size information;
    executing a translating load instruction having the data portion as an argument to generate a new data portion for a virtual-to-physical address translation table entry; and
    using the new data portion in a virtual-to-physical address translation table entry for the virtual address.

13. The computer-based method of claim 12 wherein the executing the translating load instruction further comprises:
    searching a table of translation lookaside buffer entries for a real-to-physical address translation table entry including a real address associated with the virtual address.

14. The computer-based method of claim 13 wherein the executing the translating load instruction further comprises:
    determining, following the searching finding the real-to-physical address translation table entry, whether permissions and size information in the real-to-physical address translation table entry are compatible with permissions and size information associated with the real address associated with the virtual address.

15. The computer-based method of claim 14 wherein the executing the translating load instruction further comprises:
    creating the new data portion for the virtual-to-physical address translation table entry following the determining finding that the permissions and size information in the real-to-physical translation table entry are compatible with the permissions and size information associated with the real address associated with the virtual address.

16. A processor comprising:
    a hardware table of translation table entries including real-to-physical translation table entries; and
    a translating load instruction stored in a memory wherein execution of the translating load instruction generates a method comprising:
    searching the hardware table of translation lookaside buffer entries for a real-to-physical address translation table entry including a real address associated with a virtual address for which a translation lookaside buffer miss occurred.

17. The processor of claim 16 wherein the method further comprises:
    determining, following the searching finding the real-to-physical address translation table entry, whether permissions and size information in the real-to-physical address translation table entry are compatible with permissions and size information associated with the real address.

18. The processor of claim 17 wherein the method further comprises:
    creating the new data portion for a virtual-to-physical address translation table entry following the determining finding that the permissions and size information in the real-to-physical translation table entry are compatible with the permissions and size information associated with the real address.

19. The processor of claim 18 wherein the creating further comprises:
using a physical address from the real-to-physical address translation table entry, and using the permissions and size information associated with the real address to create the new data portion.

20. A system comprising:
a memory; and
a processor coupled to the memory wherein the processor further comprises:
a hardware table of translation table entries including real-to-physical translation table entries;
a translating load instruction stored in a memory wherein execution of the translating load instruction generates a method comprising:
searching the hardware table of translation lookaside buffer entries for a real-to-physical address translation table entry including a real address associated with a virtual address for which a translation lookaside buffer miss occurred.

21. The system of claim 20 wherein the method further comprises:
determining, following the searching finding the real-to-physical address translation table entry, whether permissions and size information in the real-to-physical address translation table entry are compatible with permissions and size information associated with the real address.

22. The system of claim 21 wherein the method further comprises:
creating the new data portion for a virtual-to-physical address translation table entry following the determining finding that the permissions and size information in the real-to-physical translation table entry are compatible with the permissions and size information associated with the real address.

23. The system of claim 22 wherein the creating further comprises:
using a physical address from the real-to-physical address translation table entry, and using the permissions and size information associated with the real address to create the new data portion.

24. A structure comprising:
means for determining whether a translation lookaside buffer miss occurred for a virtual address; and
means for executing a translating load instruction, following the determining finding the translation lookaside buffer miss occurred, to generate a new data portion for a virtual-to-physical address translation table entry.

25. The structure of claim 24 wherein the means for executing the translating load instruction further comprises:
means for searching a table of translation lookaside buffer entries for a real-to-physical address translation table entry including a real address associated with the virtual address.

26. The structure of claim 25 wherein the means for executing the translating load instruction further comprises:
means for determining, following the means for searching finding the real-to-physical address translation table entry, whether permissions and size information in the real-to-physical address translation table entry are compatible with permissions and size information associated with the real address.

27. The structure of claim 26 wherein the means for executing the translating load instruction further comprises:
means for creating the new data portion for the virtual-to-physical address translation table entry following the means for determining finding that the permissions and size information in the real-to-physical translation table entry are compatible with the permissions and size information associated with the real address.

28. A structure comprising:
means for searching a table of translation lookaside buffer entries for a real-to-physical address translation table entry including a real address associated with a virtual address for which a translation lookaside buffer miss occurred; and
means for determining, following the means for searching finding the real-to-physical address translation table entry, whether permissions and size information in the real-to-physical address translation table entry are compatible with permissions and size information associated with the real address.

29. The structure of claim 28 further comprising:
means for creating a new data portion for a virtual-to-physical address translation table entry following the means for determining finding that the permissions and size information in the real-to-physical translation table entry are compatible with the permissions and size information associated with the real address.

30. A structure comprising:
means for determining whether a translation lookaside buffer miss occurred for a virtual address;
means for finding, following the means for determining finding the translation lookaside buffer miss occurred, a virtual-to-real address translation table entry for the virtual address wherein the virtual-to-real address translation table entry comprises a data portion including (i) the real address; and (ii) permissions and size information;
means for executing a translating load instruction having the data portion as an argument to generate a new data portion for a virtual-to-physical address translation table entry; and
means for using the new data portion in a virtual-to-physical address translation table entry for the virtual address.

* * * * *